US010556627B2

(12) United States Patent
Cao et al.

(10) Patent No.: US 10,556,627 B2
(45) Date of Patent: Feb. 11, 2020

(54) INTEGRATED COMPOSITE HYBRID SHOCK TOWER

(71) Applicant: Faurecia Emissions Control Technologies, USA, LLC, Columbus, IN (US)

(72) Inventors: Yang Cao, Troy, MI (US); Pankaj Ghevarchand Bedmutha, Pune (IN); Louis Moreau-Gentien, Royal Oak, MI (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 152 days.

(21) Appl. No.: 15/865,307

(22) Filed: Jan. 9, 2018

(65) Prior Publication Data

US 2019/0210661 A1 Jul. 11, 2019

(51) Int. Cl.

| | |
|---|---|
| ***B62D 29/00*** | (2006.01) |
| ***B62D 25/08*** | (2006.01) |
| ***B29C 70/70*** | (2006.01) |
| ***B29C 70/72*** | (2006.01) |
| ***B29C 70/02*** | (2006.01) |
| ***B62D 29/04*** | (2006.01) |
| *B60G 15/06* | (2006.01) |

(52) U.S. Cl.

CPC .......... *B62D 29/004* (2013.01); *B29C 70/023* (2013.01); *B29C 70/70* (2013.01); *B29C 70/72* (2013.01); *B62D 25/088* (2013.01); *B62D 29/043* (2013.01); *B60G 15/067* (2013.01); *B60G 2204/128* (2013.01); *B60G 2206/60* (2013.01); *B60G 2206/7101* (2013.01)

(58) Field of Classification Search

CPC ............................ B62D 29/004; B62D 25/088

USPC .......................................................... 296/198

See application file for complete search history.

(56) References Cited

U.S. PATENT DOCUMENTS

| | | | | |
|---|---|---|---|---|
| 5,456,517 | A | 10/1995 | Kahan et al. | |
| 6,135,498 | A | 10/2000 | Vlahovic | |
| 8,448,966 | B2 | 5/2013 | Rawlinson et al. | |
| 8,973,980 | B2 | 3/2015 | Mildner et al. | |
| 9,751,564 | B2 | 9/2017 | Muehlhausen et al. | |
| 2015/0290989 | A1 | 10/2015 | Kim et al. | |
| 2016/0244103 | A1 | 8/2016 | Amemiya | |
| 2016/0264176 | A1 | 9/2016 | Blazer et al. | |
| 2017/0008569 | A1 | 1/2017 | Hofmann et al. | |
| 2018/0029649 | A1* | 2/2018 | Maruyama | B62D 21/02 |
| 2019/0092394 | A1* | 3/2019 | Masuda | B62D 25/088 |
| 2019/0161126 | A1* | 5/2019 | Dettling | B60K 5/12 |

(Continued)

FOREIGN PATENT DOCUMENTS

| | | | | |
|---|---|---|---|---|
| CN | 109677488 | A * | 4/2019 | |
| EP | 0494562 | B1 | 8/1994 | |
| EP | 3037326 | A1 | 6/2016 | |

(Continued)

*Primary Examiner* — Jason S Morrow

(74) *Attorney, Agent, or Firm* — Carlson, Gaskey & Olds, P.C

(57) ABSTRACT

A shock tower assembly includes a shock tower body comprised of a polymer composite material, at least one reinforcement member integrated into the shock tower body, and a wheel cover comprised of the polymer composite material and integrated into the shock tower body to form a single-piece component.

19 Claims, 6 Drawing Sheets

36 30 32 36 54 50 52 40 44 34 36 42 52 46 48 48

(56) References Cited

U.S. PATENT DOCUMENTS

2019/0210662 A1* 7/2019 Eck ...................... B62D 29/048

FOREIGN PATENT DOCUMENTS

FR 2812268 A1 2/2002
FR 2967965 A1 6/2012

* cited by examiner 18
4D
52
40
42
80
84
52
86
88
52
4D 42
40
76
52
92
80

40
76
90
78
18
88
84
88
82
86
84
24
84
80
84
84
88

40
52
78
92
76
90

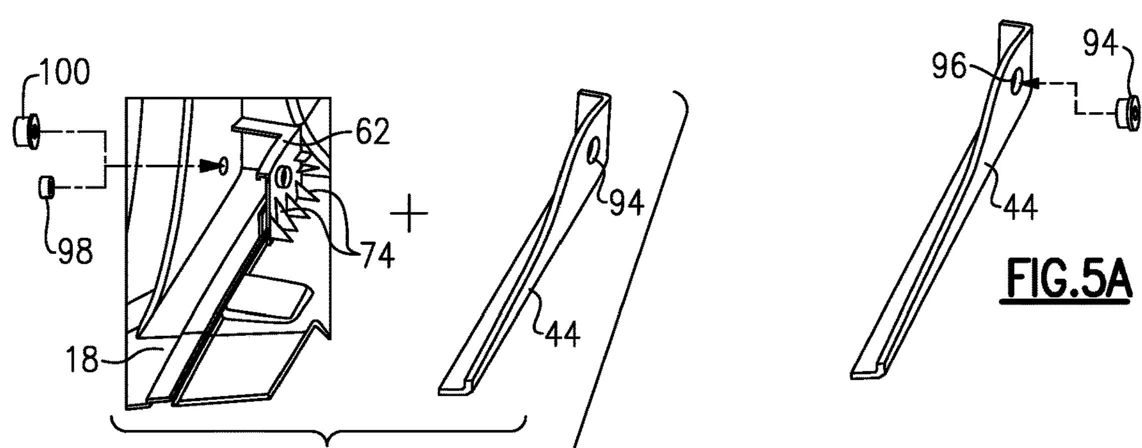
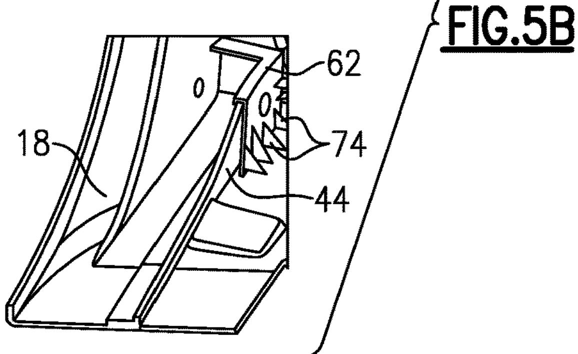
FIG.5B
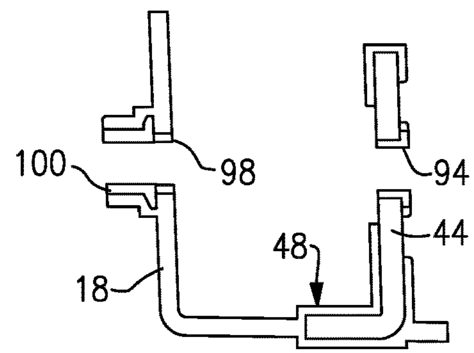
FIG.5A
FIG.5C
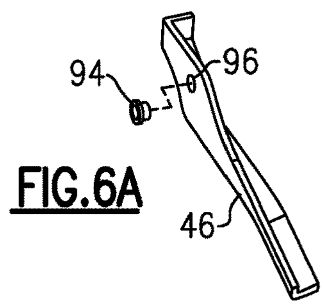
FIG.6A
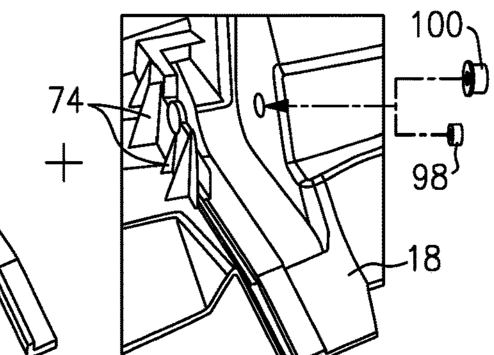
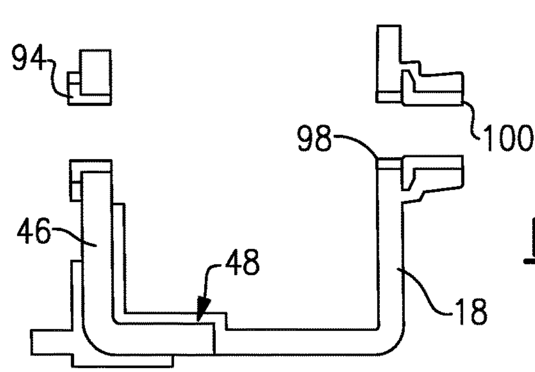
FIG.6C
62
74
18
46
FIG.6B

INTEGRATED COMPOSITE HYBRID SHOCK TOWER

TECHNICAL FIELD

The subject invention relates to a shock tower and wheel cover that are integrated together and formed from polymer composite material as single piece component to provide a hybrid shock tower configuration.

BACKGROUND OF THE INVENTION

Vehicles utilize many different suspension systems and components to absorb vibrations from road load inputs to improve vehicle control and passenger comfort. One such suspension component is a shock tower that is used to facilitate mounting of a damping component between a vehicle fixed structure and a suspension component for a vehicle wheel. Traditionally, shock towers have been formed from stamped steel components that are welded together to form a final assembly. These steel shock towers are heavy, time consuming to assemble, and adversely affect fuel economy. Die cast aluminum and magnesium shock towers provide for weight savings over traditional steel shock towers; however, these solutions have a cost premium that is only suitable for certain applications.

SUMMARY OF THE INVENTION

In one exemplary embodiment, a shock tower assembly includes a shock tower body comprised of a polymer composite material, at least one reinforcement member integrated into the shock tower body, and a wheel cover comprised of the polymer composite material and integrated into the shock tower body to form a single-piece component.

In another exemplary embodiment, a shock tower assembly includes a shock tower body comprised of a polymer composite material, and at least one reinforcement member integrated into the shock tower body at a first overmold interface to form a single-piece component, wherein the at least one reinforcement member is comprised of at least one of a metal and a continuous fiber reinforced polymer composite material.

In another exemplary embodiment, a method of forming a shock tower includes: molding a shock tower body comprised of a polymer composite material; and integrally molding at least one reinforcement member with the shock tower body at a first overmold interface to form a single-piece component, wherein the at least one reinforcement member is comprised of at least one of a metal and a continuous fiber reinforced polymer composite material.

In a further embodiment of any of the above, the wheel cover is integrally molded with the shock tower body to form the single-piece component.

In a further embodiment of any of the above, the at least one reinforcement member comprises at least one plate comprised of the metal material integrated into the shock tower body at the first overmold interface.

In a further embodiment of any of the above, the at least one reinforcement member comprises at least one mount structure comprised of the continuous fiber reinforced polymer composite material integrated into the shock tower body at a second overmold interface.

In a further embodiment of any of the above, the at least one plate is configured to mount the shock tower body to a fixed vehicle structure.

In a further embodiment of any of the above, the at least one mount structure is configured to mount a suspension control arm and/or comprises a shock tower cap configured to receive a shock absorber component.

In a further embodiment of any of the above, a third overmold interface is included that integrates at least one of a nut, fastener, and sleeve into the shock tower body.

These and other features of the present invention can be best understood from the following specification and drawings, the following of which is a brief description.

BRIEF DESCRIPTION OF THE DRAWINGS

FIG. 5A is an exploded view of a front mount flange and a mount feature to be molded with the front mount flange.

FIG. 5B is an exploded view of the front mount flange of FIG. 5A and a front flange mount area of the shock tower body that are molded together to form the single piece component.

FIG. 5C is a section view through the structure of FIG. 5B.

FIG. 6A is an exploded view of a rear mount flange and a mount feature to be molded with the rear mount flange.

FIG. 6B is an exploded view of the rear mount flange of FIG. 6A and a rear flange mount area of the shock tower body that are molded together to form the single piece component.

FIG. 6C is a section view through the structure of FIG. 6B.

DETAILED DESCRIPTION

Figure 1A:
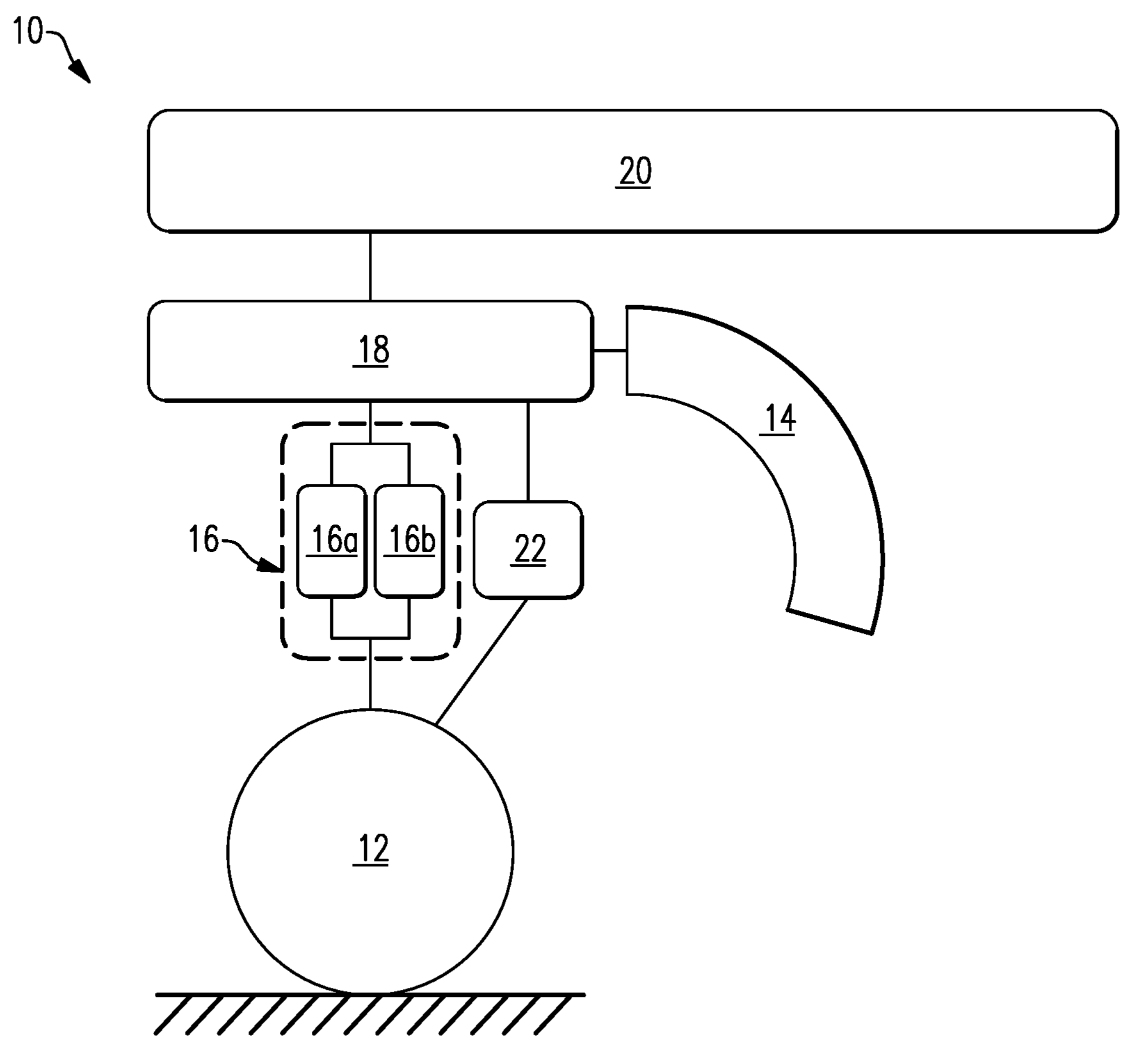
FIG. 1A is a schematic representation of a suspension assembly for a vehicle wheel.

FIG. 1A provides a schematic representation of a suspension assembly 10 for a vehicle wheel 12 that is positioned within a wheel cover 14. A strut 16, made of a spring 16*a* and a shock absorber 16*b*, is used to dampen road load inputs from the wheel 12 to facilitate vehicle control and improve passenger comfort. A shock tower 18 is used to facilitate mounting of the strut 16 to a fixed vehicle structure 20, such as a frame, chassis, body, etc. The shock tower 18 is also used to facilitate connection of the strut 16 to a suspension control arm 22 associated with the wheel 12. A wheel cover 14 is usually connected to strut 16 by mechanical fasteners or spot welding.

Figure 1B:
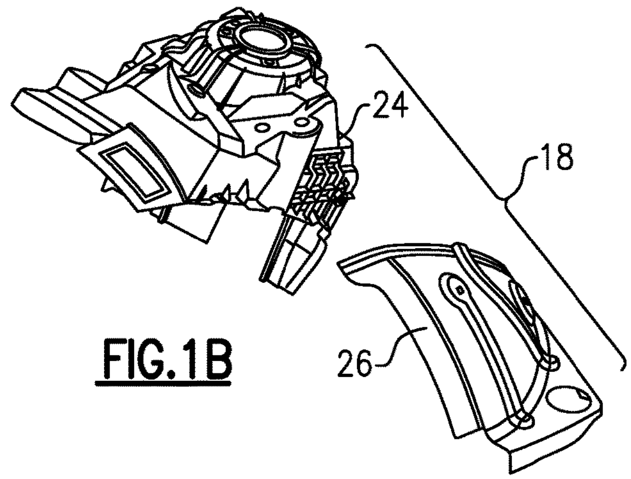
FIG. 1B is an exploded view of a composite shock tower and a composite wheel cover as used in the suspension assembly of FIG. 1A.

As shown in FIG. 1B, the shock tower 18 includes a shock tower body 24 and a wheel cover 26. The shock tower body 24 and the wheel cover 26 are integrally formed together as a single piece component as shown in FIGS. 2A-2D. The shock tower 18 comprises an integrated polymer composite hybrid shock tower. Polymer materials in the form of injection molding resin and continuous fiber reinforced thermoplastic (CFRP), for example, are used to reduce the overall weight of the shock tower 18. Additional components such as brackets, sleeves, washers, nuts, bolts, screws, etc. for example, can be overmolded into the shock tower 18 to further reduce cost and provide the hybrid configuration. This will be discussed in greater detail below.

As shown in FIGS. 2A-2D, shock tower body 24 and wheel cover 26 are both made of the same polymer composite material in a single process, which results in an integral, single piece component. In one example, an injection molding process is used to achieve the integration, which will be discussed in greater detail below. In one example, the shock tower body 24 has thickness varying from 2 mm to 8 mm depending on the design requirements for a specific vehicle application. The thickness of the wheel cover 26 can be similar to that of the shock tower body 24 or can also be varied as needed for specific applications.

In one example, the shock tower 18 includes at least one reinforcement member that is integrated into the shock tower body 24. In one example, the reinforcement member comprises one or more brackets or plates 30, 32, 34 that are molded with the shock tower body 24 as part of the single piece component. In one example, the plates 30, 32, 34 are comprised of a metal material and are overmolded at a first overmold interface 36 (FIGS. 2D and 7B) to form the hybrid configuration. In one example, the metal material comprises sheet metal or the same metal material as used for an associated body-in-white (BIW), which corresponds to the fixed vehicle structure 20 as shown in FIG. 1A for example. In one example, the plates 30, 32, 34 facilitate attachment of the shock tower 18 to the BIW.

Figure 2A:
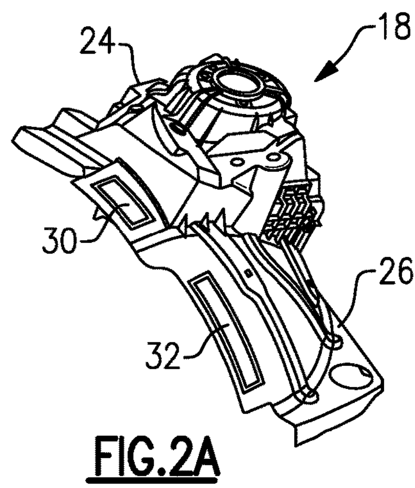
FIG. 2A is a perspective view of a composite shock tower and wheel cover integrally formed as a single piece component.
Figure 2B:
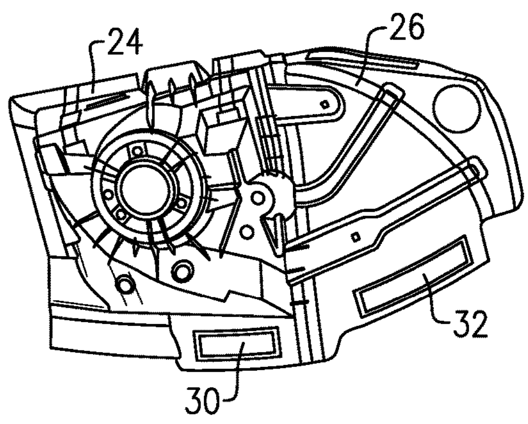
FIG. 2B is a top view of the composite shock tower and wheel cover of FIG. 2A.
Figure 2C:
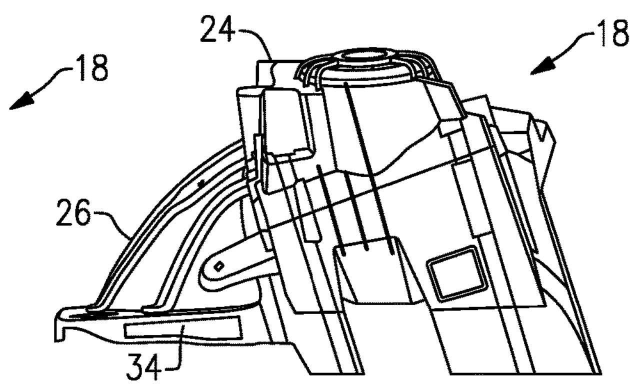
FIG. 2C is a side view of the composite shock tower and wheel cover of FIG. 2A.
Figure 2D:
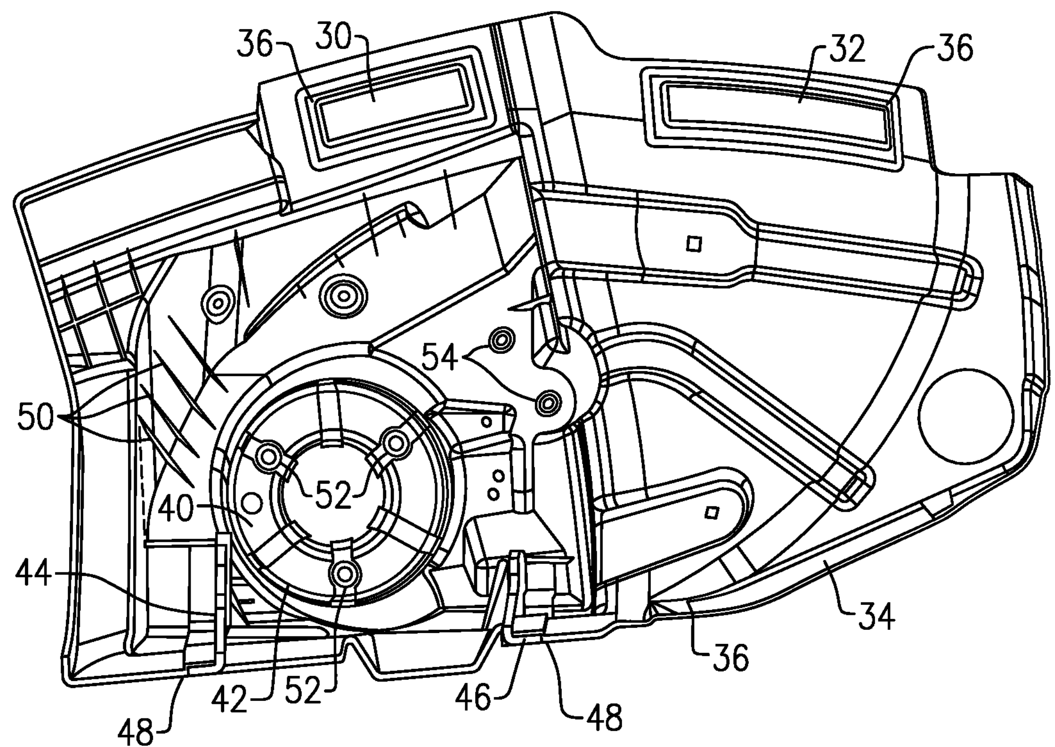
FIG. 2D is a bottom view of the composite shock tower and wheel cover of FIG. 2A.
Figure 4C:
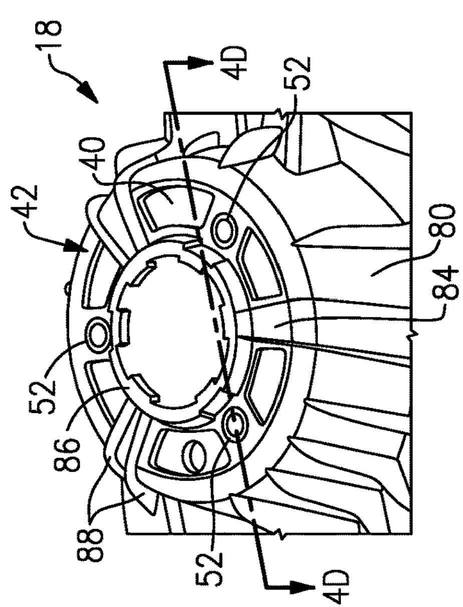
FIG. 4C is a perspective view of the components of FIG. 4B molded together as the single piece component.
Figure 4D:
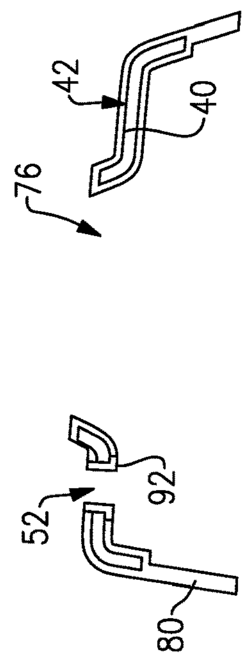
FIG. 4D is a section view as identified in FIG. 4C.
Figure 4B:
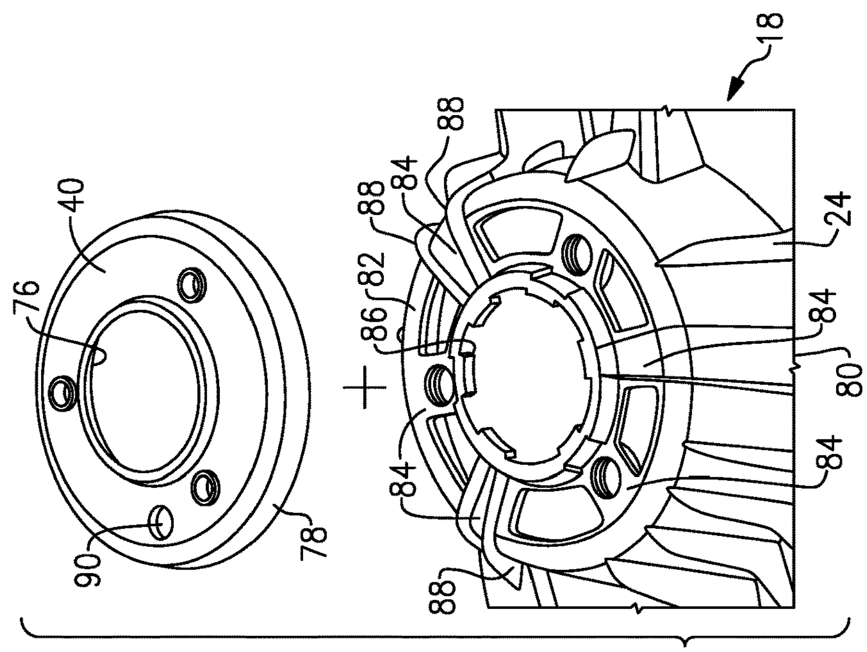
FIG. 4B is an exploded view of the cap of FIG. 4A and a cap mount area of the shock tower body.
Figure 4A:
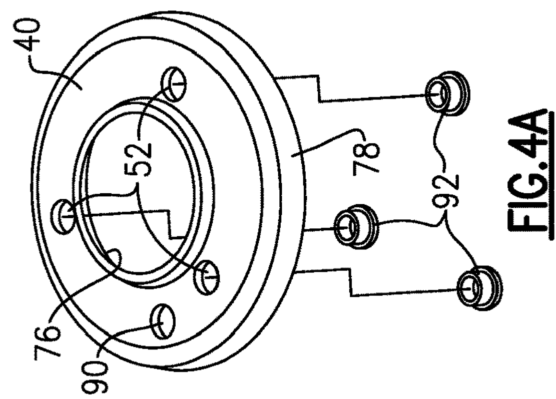
FIG. 4A is an exploded view of a shock tower cap and mount features to be molded with the shock tower cap.

In another example, the at least one reinforcement member comprises a shock tower cap 40 that is made of CFRP and overmolded with the shock tower body 24 at a second mold interface 42 (FIGS. 2D and 4C-4D). In another example, the at least one reinforcement member includes front 44 and rear 46 mount flanges that are made of CFRP and overmolded with the shock tower body 24 at a third mold interface 48 (FIGS. 2D, 5-B-C and 6B-C). The inclusion of the overmolded shock tower cap 40 and the front/rear mount flanges 44, 46 provides increased mechanical properties in desired areas, which in the examples shown, respectively interface with the strut 16 and the suspension control arm 22.

Also shown in FIG. 2D is a plurality of ribs 50 formed in a specified ribbing pattern to increases the stiffness of the shock tower 18 in desired areas. Various forms of ribbing patterns such as square, rectangular, X-shape, honey comb or circular can be employed in the shock tower body 24 or wheel cover 26 to stiffen the shock tower 18. It is possible to form the rib patterns in any desired number/pattern via the injection molding process.

One or more mounting holes 52 may also formed in the shock tower cap 40 and shock tower body 24 to provide a mount interface for the strut 16. Additionally, the shock tower 18 may include one or more additional mounting holes 54 that provide an interface for assembly of the shock tower 18 with other elements of the vehicle.

Figure 3:
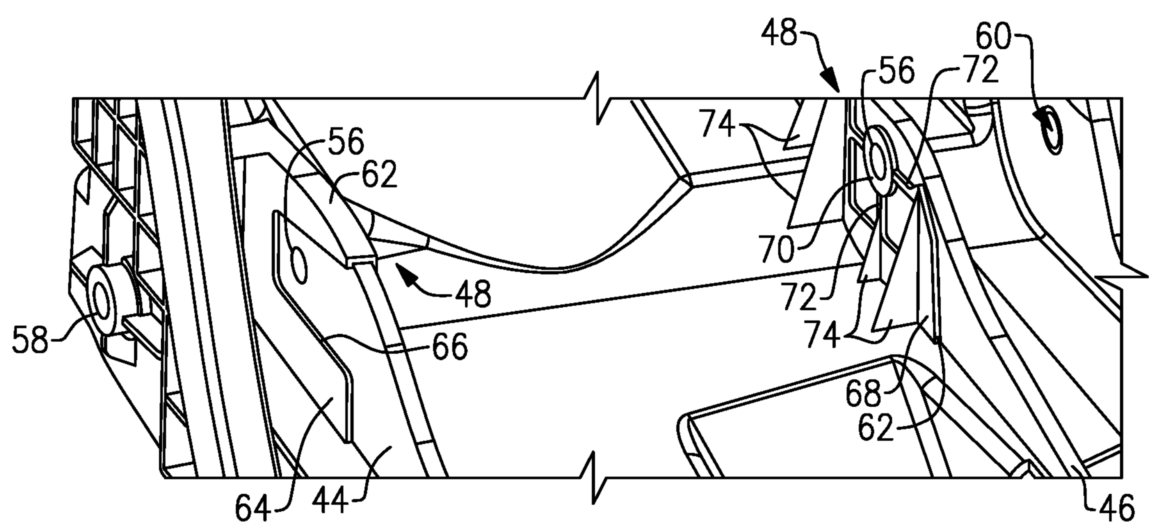
FIG. 3 is an enlarged view of reinforcement members overmolded into the shock tower body for attachment to a suspension control arm.

FIG. 3 shows a magnified view of an interface of the front 44 and rear 46 mount flanges that are overmolded with the shock tower body 24 and that cooperate with the suspension control arm 22. The control arm 22 is attached with fasteners that pass through openings 56 where one fastener tightens into a corresponding opening 58 on the left of FIG. 3 and another fastener tightens into a corresponding opening 60 on the right. The shock tower body 24 includes slot or sleeve portions 62 that receive respective ends of the front 44 and rear 46 mount flanges. These sleeve portions 62 include walls that are overmolded to engage opposing sides of the front 44 and rear 46 mount flanges at the overmold interface 48.

An outer facing wall 64 includes a slot or opening 66 to allow the fasteners to respectively pass through toward the openings 58, 60. An inner facing wall 68 includes a flat area 70 that provides a seat for a head of the fastener and one or more arms 72 that attach the flat area 70 to the wall 68. Additional strut or rib structures 74 are present around the overmolded sleeve portions 62 to transfer the loads to the main shock tower body 24 and to increase the mechanical properties of the attachment interface.

FIGS. 4A-D illustrates the shock tower cap 40, which transfers the load from the strut 16 to the shock tower 18 via direct contact and fasteners that pass through the openings 52. In one example, the cap 40 can be made of either CFRP or sheet metal, thermoformed or stamped before injection overmolding. Optionally, the cap 40 can be directly formed with a one shot process (forming and injecting). The cap 40 has ring shaped body with an opening 76 at a center of the cap 40 to receive a head of the strut 16 and/or any sensor or electronic device wire harness associated therewith. In one example, the cap 40 includes an outer flange 78 that extends about an outer periphery of the ring shaped body in a direction toward the shock tower body 24 to increase the stiffness and transfer the load to a shock tower vertical wall 80.

The shock tower vertical wall 80 extends upwardly to an upper cap portion that is molded around the cap 40. In one example, the upper cap portion area includes a peripheral recess 82 to receive an outer peripheral edge of the cap 40, and arms 84 that are molded around the cap 40. The arms 84 extend between the vertical wall 80 and a center ring 86 that includes an opening that aligns with the center opening 76 in the cap 40.

A plurality of ribs 88 are additionally provided at the top of the shock tower 18 to increase the strength and stiffness as needed. In one example, the strut 16 is mounted directly to the cap 40 and the holes 52 comprise three radially symmetrical holes that are drilled through the cap 40 to allow for the passage of fasteners. An additional hole 90 can be provided for positioning purposes.

In one example, additional mount features such as flanged bushings/compression limiters 92 are overmolded in the holes 52 during the injection molding process to keep metal-to-metal contact and transfer load from the strut 16 to the upper cap of the shock tower body 24. These flanged bushings/compression limiters 92 are required when polymer material is in a sandwiched relationship between a head of the fastener and the assembled strut 16 such that the thickness of the polymer material is not reduced over time due to creeping caused by the continuous force applied.

FIGS. 5A-5C show overmolding of the front mounting flange 44 with the shock tower body 24. In one example, the front mounting flange 44 is a separate component that is pre-manufactured prior to the injection molding process by thermoforming of CFRP sheets. The front mounting flange 44 is used to mount the control arm 22 as discussed above. The thickness of the front mounting flange 44 can range from 2 mm to 8 mm, for example, but can be varied depending on vehicle load requirements. In one example, metal bushings/compression limiters 94 are pressed into one or more holes 96 in the front mounting flange 44 to avoid direct contact of CFRP material with metal mounting fasteners for the same reasons of eliminating creep. The front mounting flange 44 is then overmolded during the injection molding process via the sleeve portions 62 as described above. The stiffening ribs 74 can be formed around the front mount flange to reinforce the attachment areas as needed. For the same reason, a metal spacer 98 with a nut 100 can be overmolded in the shock tower body 24 for control arm attachment.

FIGS. 6A-6C show overmolding of the rear mounting flange 46 with the shock tower body 24. In one example, the rear mounting flange 46 is a separate component that is pre-manufactured prior to the injection molding process by thermoforming of CFRP sheets. The rear mounting flange 46 is used to mount the control arm 22 as discussed above. The thickness of the rear mounting flange 46 can range from 2 mm to 8 mm, for example, but can be varied depending on vehicle load requirements. In one example, metal bushings/compression limiters 94 are pressed into one or more holes 96 in the rear mounting flange 46 to avoid direct contact of CFRP material with metal mounting fasteners for the same reasons discussed above. The rear mounting flange 46 is then overmolded during the injection molding process via the sleeve portions 62 as described above. The stiffening ribs 74 can be formed around the rear mount flange to reinforce the attachment areas as needed. For the same reason, a metal spacer 98 with a nut 100 can be overmolded in the shock tower body 24 for control arm attachment.

Figure 7A:
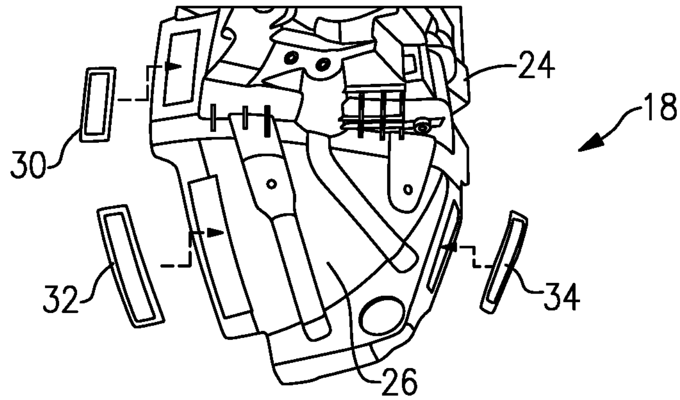
FIG. 7A is an exploded view of reinforcement members and the shock tower body.
Figure 7B:
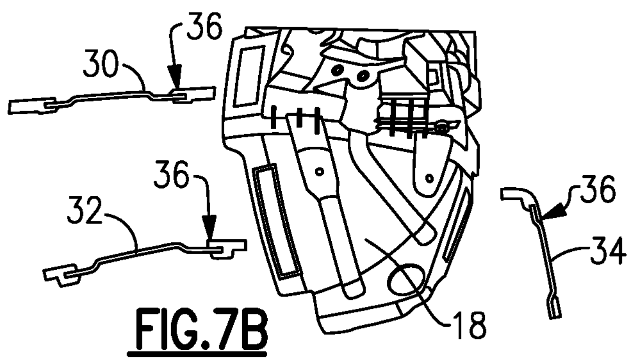
FIG. 7B is a perspective view of the reinforcement members of FIG. 7A integrally molded with the shock tower to form the single piece component and which further shows overmolded interfaces between the reinforcement members and shock tower body.

FIGS. 7A-7B illustrate metal plates 30, 32, 34 overmolded into the shock tower 18 for assembly to the BIW. The plates 30, 32, 34 are used to facilitate the assembly of the shock tower 18 into the vehicle in compliance with existing resistance spot welding and fastener assembly processes. The metal plates 30, 32, 34 are formed to have at least one upper surface and one lower surface which will be in contact with surfaces of upper and lower tools. This is to ensure the positioning of the metal plates 30, 32, 34 and to prevent their movement during injection molding. These metal plates 30, 32, 34 may require surface treatment to avoid galvanic corrosion which is a standard practice for dissimilar material assembly into the BIW.

Figure 8A:
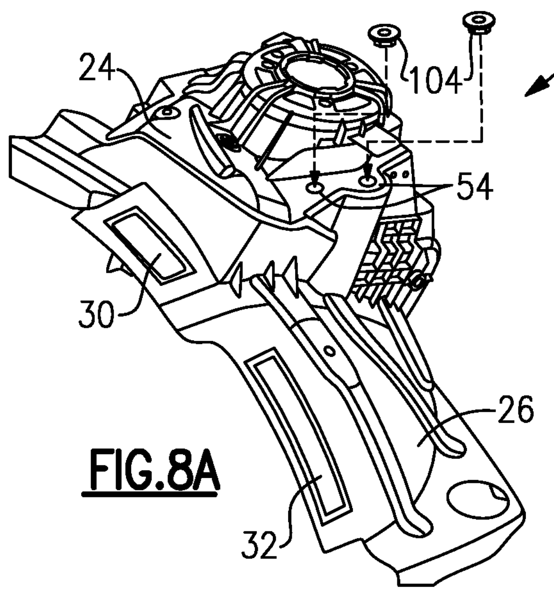
FIG. 8A is an exploded view of mount members and the shock tower body.
Figure 8B:
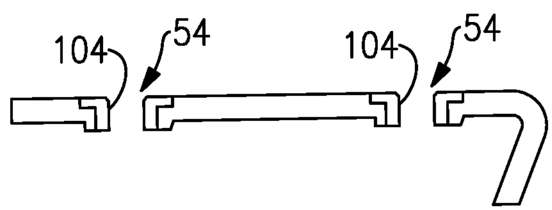
FIG. 8B is a section view of the mount members as overmolded into the shock tower body of FIG. 8A.

FIGS. 8A-8B illustrate the overmolding of additional attachment members 104 such as metal nuts for example, with the shock tower 18. These can be used to fasten other metallic parts on the shock tower with fasteners. In one example, all metallic parts are treated with a coating or made of stainless steel to avoid any galvanic corrosion due to the different electrode potential if the polymer composite material contains carbon fibers.

The subject invention uses polymer composite material, such as PA66 reinforced with discontinuous and continuous fiber, for example, to provide for improved mechanical performance in the shock tower 18, as well as a reduction of weight and cost as compared to current die cast designs, and without compromising mechanical performance requirements (NVH, pot hole load, durability, etc.) Additionally, the integration of the shock tower and wheel cover into a single part provides the benefits of lower part cost, elimination of sub-assembly steps, lower capital investment, and while also avoiding corrosion and part tearing.

The various rib formations, for example long running vertical and horizontal ribs in specified patterns, provide for connection of the shock tower at suspension attachment areas to BIW mount regions effectively reducing the risk of shock tower collapse and failure under load. The ribs can be patched to a large area effectively increasing the local stiffness with minimum use of material. Further, the overmolding of CFRP mount flanges enables the use of high performance material to meet the load requirements caused by the suspension system. Overmolding of the metal plates provides seamless assembly of shock tower to BIW using existing resistance spot welding and fastener assembly processes widely adopted in the automotive industry.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A shock tower assembly comprising:

a shock tower body comprising a polymer composite material;

at least one reinforcement member integrated into the shock tower body, wherein the at least one reinforcement member comprises at least one metal plate or bracket; and a wheel cover comprised of the polymer composite material and integrated into the shock tower body to form a single-piece component.

2. The shock tower assembly according to claim 1, wherein the at least one metal plate or bracket is configured to mount the shock tower body to a fixed vehicle structure.

3. The shock tower assembly according to claim 1 wherein the at least one reinforcement member comprises at least one mount structure comprised of continuous fiber reinforced polymer composite material.

4. The shock tower assembly according to claim 3 wherein the at least one mount structure comprises a shock tower cap configured to receive a strut component.

5. The shock tower assembly according to claim 3 wherein the at least one mount structure comprises a suspension control arm mount flange.

6. A shock tower assembly comprising:

a shock tower body comprising a polymer composite material;

at least one reinforcement member integrated into the shock tower body, wherein the at least one reinforcement member comprises at least one metal plate and at least one mount structure comprised of continuous fiber reinforced polymer composite material; and a wheel cover comprises of the polymer composite material and integrated into the shock tower body to form a single-piece component.

7. The shock tower assembly according to claim 6 wherein the at least one metal plate is configured to mount the shock tower body to a fixed vehicle structure and the at least one mount structure comprises a suspension control arm mount flange and/or a shock tower cap configured to receive a strut component.

8. The shock tower assembly according to claim 6 including a first overmold interface between the shock tower body and the at least one metal plate and a second overmold interface between the at least one mount structure and the shock tower body.

9. A shock tower assembly comprising:

a shock tower body comprising a polymer composite material; and at least one reinforcement member integrated into the shock tower body at a first overmold interface to form a single-piece component, wherein the at least one reinforcement member is comprised of at least one of a metal and a continuous fiber reinforced polymer composite material.

10. The shock tower assembly according to claim 9 including a wheel cover comprised of a polymer composite material and integrated with the shock tower body to form the single-piece component.

11. The shock tower assembly according to claim 9 wherein the at least one reinforcement member comprises at least one plate comprised of the metal material integrated into the shock tower body at the first overmold interface and at least one mount structure comprised of the continuous fiber reinforced polymer composite material integrated into the shock tower body at a second overmold interface.

12. The shock tower assembly according to claim 11 including a third overmold interface that integrates at least one of a nut, fastener, and sleeve into the shock tower body.

13. A method of forming a shock tower comprising:

molding a shock tower body composed of a polymer composite material; and integrally molding at least one reinforcement member with the shock tower body at a first overmold interface to form a single-piece component, wherein the at least one reinforcement member is comprised of at least one of a metal and a continuous fiber reinforced polymer composite material.

14. The method according to claim 13 including integrally molding a wheel cover comprised of a polymer composite material with the shock tower body to form the single-piece component.

15. The method according to claim 13 wherein the at least one reinforcement member comprises at least one first reinforcement member comprised of the metal material and at least one second reinforcement member comprised of the continuous fiber reinforced polymer composite material, and including integrally molding the at least one first reinforcement member to the shock tower body via the first overmold interface, and integrally molding the at least one second reinforcement member to the shock tower body via a second overmold interface.

16. The method according to claim 15 including forming the at least one first reinforcement member as at least one metal plate or bracket configured to mount the shock tower body to a fixed vehicle structure.

17. The method according to claim 15 including forming the at least one second reinforcement member as at least one mount structure configured to mount a suspension control arm and/or as a shock tower cap configured to receive a strut component.

18. The method according to claim 15 including forming at least one third overmold interface that integrates at least one of a nut, fastener, and sleeve into the single piece component.

19. The method according to claim 13 including integrally molding one or more stiffening ribs into the shock tower body.

* * * * *